United States Patent
Schade et al.

(10) Patent No.: US 7,202,809 B1
(45) Date of Patent: Apr. 10, 2007

(54) FAST ACTING ACTIVE PROTECTION SYSTEM

(75) Inventors: David A. Schade, San Carlos, CA (US); Thomas C. Winant, Los Altos, CA (US); Jaime Alforque, Salinas, CA (US); Jeffrey Faul, Los Gatos, CA (US); Kenneth B. Groves, La Honda, CA (US); Valent Horvatich, Scottsdale, AZ (US); Marco Albert Middione, Scotts Valley, CA (US); Christopher Tarantino, Livermore, CA (US); James Robert Turner, Campbell, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 163 days.

(21) Appl. No.: 10/842,791

(22) Filed: May 10, 2004

(51) Int. Cl.
*G01S 13/86* (2006.01)
*G01S 17/88* (2006.01)
*G01S 13/00* (2006.01)
*G01S 17/66* (2006.01)

(52) U.S. Cl. .................. 342/67; 342/52; 342/53; 342/54; 342/61; 342/62; 342/175; 342/195; 244/3.1; 356/4.01; 89/1.11; 89/1.8; 89/1.816; 89/1.41

(58) Field of Classification Search ............ 89/1.11, 89/125–127, 1.41, 1.815, 1.816, 1.7–1.706, 89/1.8; 244/3.1–3.3; 342/27, 28, 59, 61–69, 342/175, 195, 450–465, 52–56; 102/430, 102/437; 356/4.01–5.15

See application file for complete search history.

(56) References Cited

U.S. PATENT DOCUMENTS

| | | | | |
|---|---|---|---|---|
| 3,706,096 A | * | 12/1972 | Hammack | 342/463 |
| 3,795,911 A | * | 3/1974 | Hammack | 342/463 |
| 3,946,640 A | * | 3/1976 | Baumann | 89/1.815 |
| 3,996,590 A | * | 12/1976 | Hammack | 342/465 |
| 4,574,680 A |   | 3/1986 | Nicodemus | |
| 5,099,764 A |   | 3/1992 | Dale et al. | |
| 5,229,540 A | * | 7/1993 | Schabdach et al. | 89/1.11 |
| 5,471,213 A | * | 11/1995 | Hergesheimer | 342/59 |
| 5,661,254 A | * | 8/1997 | Steuer et al. | 89/1.815 |
| 5,917,442 A | * | 6/1999 | Manoogian | 342/62 |
| 6,563,450 B1 | * | 5/2003 | Wallace | 342/62 |
| 6,603,421 B1 | * | 8/2003 | Schiff et al. | 342/62 |

* cited by examiner

*Primary Examiner*—Bernarr E. Gregory
(74) *Attorney, Agent, or Firm*—Patterson, Thuente, Skaar & Christensen, P.A.

(57) ABSTRACT

A fast acting active protection system for military vehicles defeats RPG (rocket propelled grenade) threats fired from close ranges. The system minimizes the hazard to troops and civilians nearby. The system uses a plurality of passive sensors to locate the threat and initialize the system. A low cost radar or laser tracker is used as the means to determine range, velocity, and (if required) angular position of the threat. The countermunition used may be one of several choices, with the requisites being that the countermunition provides fast response with low inertia, and is able to damage or destroy the detected threat. A multi-barrel recoilless gun is the weapon of choice. A launching device is used to deploy and aim the countermunition and the tracking means. On board software and electronics are used to control the system.

10 Claims, 3 Drawing Sheets

FAST ACTING ACTIVE PROTECTION SYSTEM

BACKGROUND OF THE INVENTION

1. Field of the Invention

The present invention relates generally to military defense systems, and more particularly is a fast acting active protection system that is designed to defeat RPG (rocket propelled grenade) threats fired from close range.

2. Description of the Prior Art

When a military operation is carried out in an urban environment, or under an ambush situation, RPG (rocket propelled grenade) threats can be fired from very close ranges. This means that there is very little travel time from the position of the RPG to the targeted personnel, and thus very little time for the targeted personnel to locate, respond to, and destroy the threats. An explosive countermunition can be used to rapidly engage the incoming threat; however, explosives significantly increase the hazard of fratricide. Several active protection systems are in various stages of development and fielding. These include DROZD and ARENA from Russia, Trophy from Israel, Diehl's AWiSS from Germany and NTAPS and SLID from the US. These systems have different characteristics, benefits, and drawbacks. DROZD is an explosive close-in countermeasure system firing from fixed tubes and offering limited coverage. ARENA is another close-in system also firing from fixed positions, with better coverage than DROZD but posing a high integration burden due to system size. Trophy is small, fast, has gimbals, and offers wide coverage, but is not multi-shot capable and its explosive may pose problems for a light skinned vehicle. Diehl's system uses a fragmenting grenade with a fairly inflexible timing scheme. NTAPS uses a tracking radar, gimbaled launcher, and rocket countermeasure with a total time line too slow for close-in RPG threats.

Accordingly, it is an object of the present invention to provide a protection system that has a very short reaction time in order to successfully defeat RPG and similar threats in a close-in, short-time line scenario.

It is a further object of the present invention to provide a system that quickly detects and targets present threats for a countermunition.

It is a still further object of the present invention to provide a system that minimizes the fratricide risk to personnel compared to other active protection systems while still being effective against the threat.

It is a still further object of the present invention to provide a system that utilizes infrared and laser warning sensors.

SUMMARY OF THE INVENTION

The present invention is a fast acting active protection system for military vehicles which defeats RPG (rocket propelled grenade) threats fired from close ranges. The system minimizes the hazard to troops and civilians nearby. The system uses a plurality of passive sensors to locate the threat and initialize the system. A low cost radar or laser tracker is used as the means to determine range, velocity, and (if required) angular position of the threat. The countermunition used may be one of several choices, with the requisites being that the countermunition provides fast response with low inertia to damage or destroy the detected threat. A multi-barrel recoilless gun is the weapon of choice. A launching device is used to deploy and aim the countermunition and the tracking means. On board software and electronics are used to control the system.

An advantage of the present invention is that the system requires a very short time to respond to an incoming threat.

Another advantage of the present invention is that it uses low cost components in the detection apparatus.

A still further advantage of the present invention is that it is equipped with countermunitions sufficient to effectively damage or destroy detected threats.

Yet another advantage is that the present invention poses a comparatively low fratricide risk to people in the area and occupants of lightly armored vehicles.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
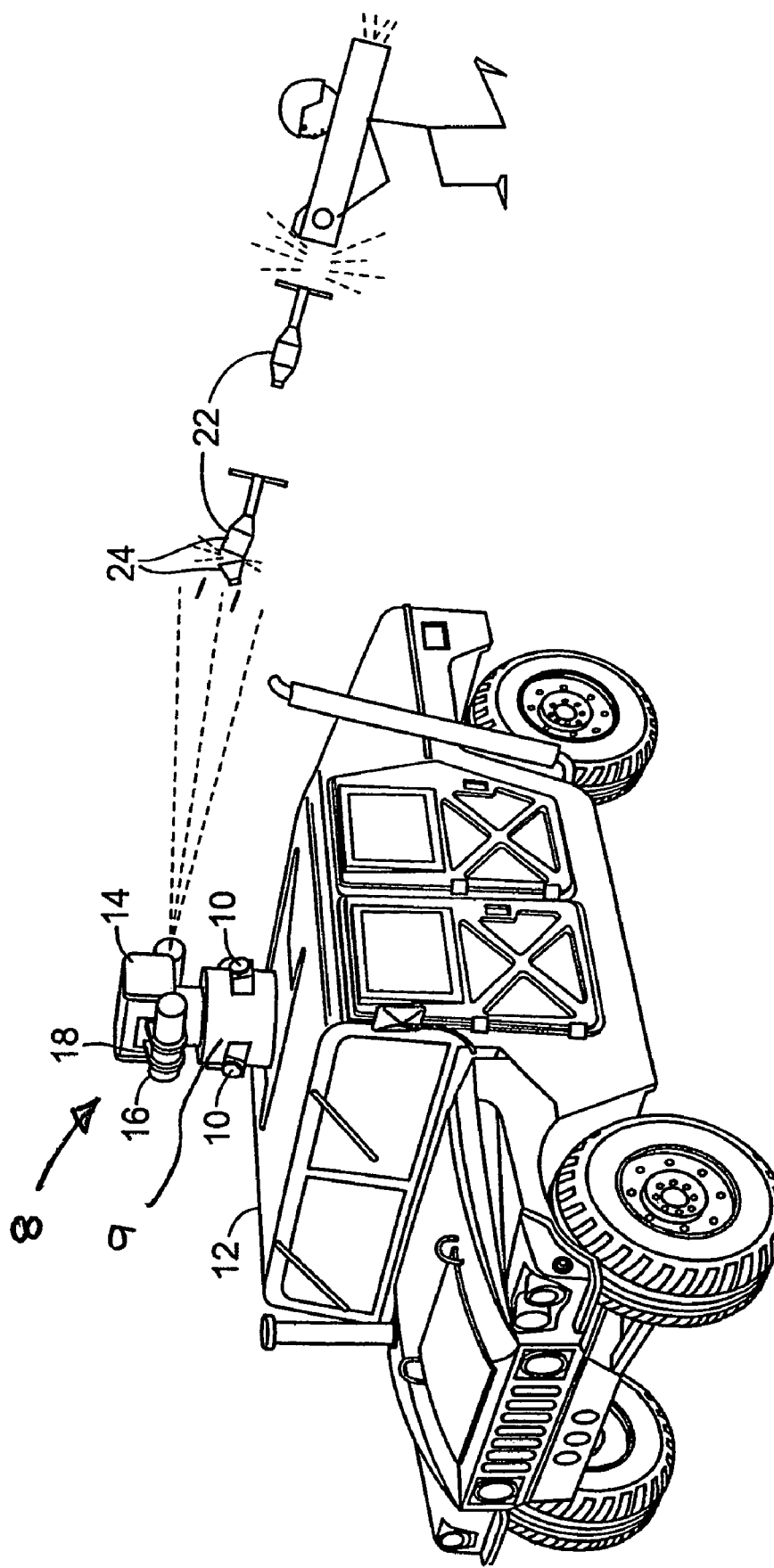
FIG. 1 is a perspective view of a military vehicle with the system of the present invention in use.

The present invention is a fast acting active protection system. The system 8 comprises a plurality of two-color IR and laser warning sensors 10 that are strategically distributed on the vehicle 12. Proper distribution of the warning sensors 10 allows the system to provide hemispherical threat detection coverage. The warning sensors 10 locate the incoming threat 22 and initiate the other components of the protection system 8.

Next, the tracking means 14 and the countermunition 16 are deployed by a launcher 18. The launcher 18 must be able to move the tracking means 14 and the countermunition 16 in all directions so that the tracking means 14 and the countermunition 16 can be pointed in the direction of the detected incoming threat 22 with sufficient accuracy. The tracking means 14 can be either a radar system or a laser radar device. Typically, the tracking means 14 and the countermunition 16 will be fixed to the vehicle 12. The tracking means 14 will generally comprise a plurality of sensors to give desired area coverage. The combination of the warning sensors 10 and tracking means 14 confirms the threat 22 is moving toward the vehicle and that the threat 22 must be engaged and destroyed with the countermunition 16.

Data from the tracking means 14 and the warning sensors 10 is compared to data on threat launch profiles stored in the memory 9 of the protection system 8 and is used to formulate a fire-control solution for the countermunition 16. The countermunition 16 may include any combination of at least four devices: (1) a multi-barrel gun which uses powder (propellant) to fire many projectiles in a pattern to intercept the threat; (2) a two stage countermunition which first pops out a warhead using a small powder (propellant) charge and then explosively launches fragments at the incoming threat; (3) a single barrel-shotgun; and (4) a net or a parachute to catch the incoming threat.

The countermunition 16 will be placed high on the vehicle so that it fires down on most ground launched threats 22.

Fragments 24 will therefore be more likely to be driven into the ground, thereby reducing the hazard to people in the immediate vicinity. The fragments 24 are on nearly the same flight path as the incoming threat. The fragments 24 do not tend to fly radially as they do with many prior art active protection systems. The fragments 24 created by the active protection system of the present invention therefore pose a greatly reduced hazard to civilians and friendly personnel in the area as compared to the hazards generated by other active protection systems.

Figure 2:
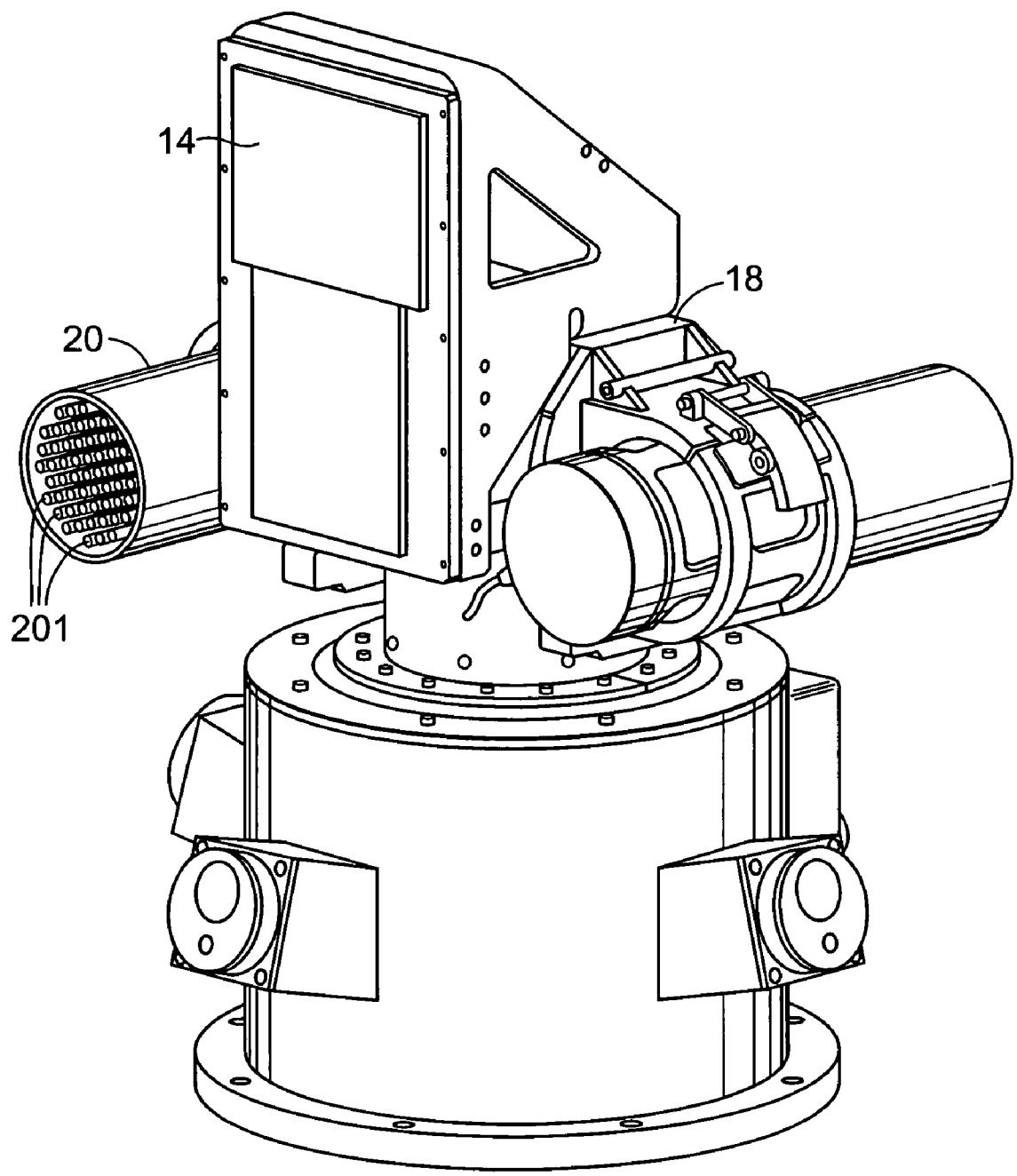
FIG. 2 is a perspective view of a countermunition device used in the system.
Figure 3:
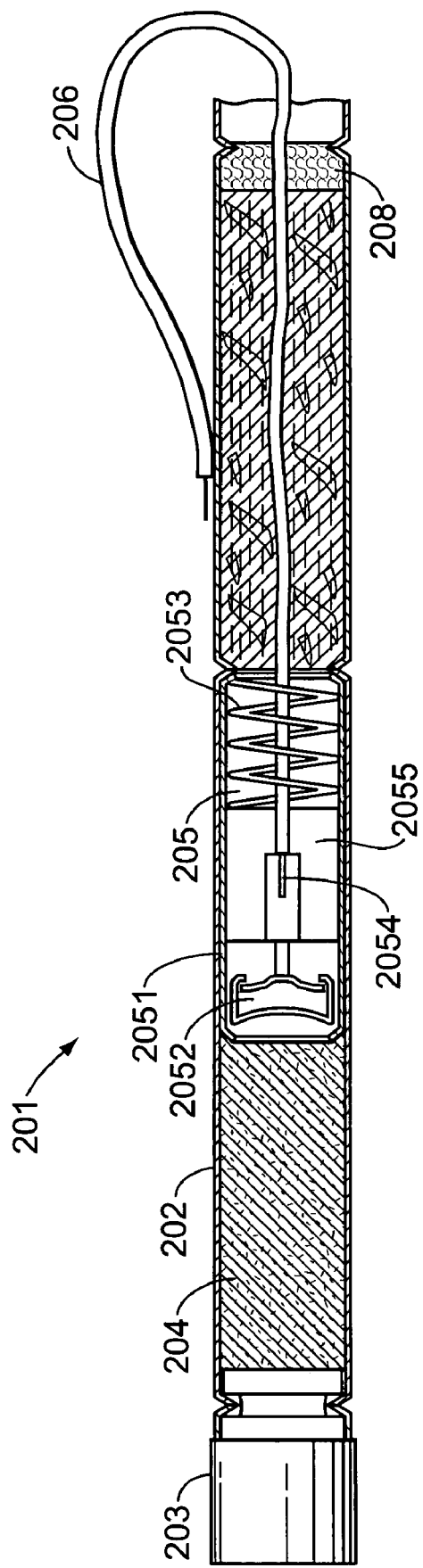
FIG. 3 is a sectional view of a recoilless cartridge of a multi-barrel countermunition device.

In the preferred embodiment, the countermunition 16 is a multi-barrel gun 20, which is shown in further detail in FIGS. 2 and 3. The multi-barrel gun 20 comprises a plurality of recoilless cartridges 201 formed with a main tube body 202, which will most often be formed from brass. The weapon is intended to utilize a projectile 203 that will most often be a 40 grain, 0.259" brass projectile 203. A propellant 204 is packed into the tube body 202 directly behind the projectile 203.

A firing mechanism 205 is loaded behind the propellant 204. The firing mechanism 205 comprises a housing 2051 that encloses a primer 2052, a spring 2053, and a firing pin 2054 with a centralizer 2055. The firing mechanism 205 is actuated by a triggering means 206, which is typically either a bridge wire or a rapid deflagration cord.

The recoilless cartridge 201 utilizes a recoil slurry 207 to absorb the recoil force upon firing. In the preferred embodiment, the recoil slurry comprises a mixture of 60% tungsten powder and 40% hand cream. A packing 208 at the end of the tube body 202 keeps the slurry 207 in position and serves as a ballast to maximize pressure, and therefore firing power, in the tube body 202 of the cartridge 201. When the cartridge 201 is fired, the slurry is burned so that only an inert tungsten powder is vented through the packing 208. The vented tungsten powder is released with minimal pressure, so that the powder does not burn or penetrate human skin.

Alternatively, the recoil mass can be a heavy powder such as tungsten, steel, or the like. If desired, the recoil mass can be bound by a low strength, brittle adhesive, a grease or other thixotropic fluid such as toothpaste, or an aqueous polyurethane dispersion (a water based adhesive that coats powders and holds them together).

One of the key characteristics of the multi-barrel gun 20 is that it provides the active protection system with superior performance characteristics as compared to known active protection systems. The fast acting active protection system of the present invention excels in the four speed governing factors for an active protection system: (1) Initiation time. Known systems which utilize small missiles require approximately 10 ms following a fire signal before they move. Because the countermunitions 16 of the active protection system of the present invention are lighter than conventional systems, and therefore have less inertia, the active protection system of the present invention responds in about 1 ms. (2) Acceleration rate. The missiles used in known systems require several meters of travel and up to 100 ms to reach their maximum speed. The projectile 203 of the multi-barrel gun 20 reaches maximum speed at 0.25 meters and 0.5 ms. (3) Final velocity. The projectiles 203 of the multi-barrel gun 20 move approximately three times as fast as a missile at maximum speed. 4) Inertia. The length and mass of the countermeasure are much less than that of other countermeasures, resulting in a countermeasure inertia that is orders of magnitude less than the inertia of a missile countermeasure.

In order to overcome these time line limitations, some active protection systems use explosives to launch missiles. The drawback of this method is that many pounds of explosives are required (5–20 lbs. as compared to the 0.25 pounds required in the present invention), which means that such systems cannot be used on light vehicles.

Because the multi-barrel gun 20 fires in a focused pattern, the number of projectiles 203 fired as compared to prior art systems is reduced. Fewer projectiles 203 and a tighter firing pattern further reduce the threat from stray projectiles 203 or from fragments 24 to civilians and friendly personnel in the area.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

The invention claimed is:

1. An active protection system for a vehicle comprising:
   a network of warning sensors to detect incoming threats and to initiate countermeasures,
   a means to track the incoming threats,
   a countermunition with a launcher, and
   a memory device; wherein
   data from said means to track the incoming threats and from said warning sensors is compared to data stored in said memory device, said data being used to formulate a fire-control solution for said countermunition.

2. The active protection system of claim 1 wherein:
   said warning sensors comprise a combination of two-color IR and laser warning sensors that are strategically distributed on said vehicle to allow said system to provide hemispherical threat detection coverage.

3. The active protection system of claim 1 wherein:
   said means to track the incoming threats comprises a radar system or a laser radar device.

4. The active protection system of claim 1 wherein:
   said countermunition comprises a recoilless multi-barrel gun.

5. The active protection system of claim 4 wherein:
   said recoilless multi-barrel gun comprises a plurality of cartridges, each said cartridge comprising;
   a main tube body,
   a projectile,
   a propellant packed into said main tube body directly behind said projectile,
   a firing mechanism with a means to trigger said firing mechanism,
   a recoil mass, and
   a packing ballast; wherein
   when said means to trigger said firing mechanism actuates said firing mechanism, said propellant is ignited to fire said projectile, said recoil mass absorbing a recoil force.

6. The active protection system of claim 5 wherein:
   said recoil mass comprises in part a fluid component.

7. The active protection system of claim 5 wherein:
   said recoil mass comprises a mixture of tungsten powder the fluid component.

8. The active protection system of claim 5 wherein:
   said recoil mass comprises in part a thixotropic fluid.

9. The active protection system of claim 5 wherein:
   said recoil mass comprises in part an aqueous polyurethane dispersion.

10. The active protection system of claim 4 wherein:
   said recoilless multi-barrel gun comprises a plurality of cartridges, each said cartridge utilizing a recoil mass to absorb a recoil force.

* * * * *

UNITED STATES PATENT AND TRADEMARK OFFICE
CERTIFICATE OF CORRECTION

PATENT NO. : 7,202,809 B1 Page 1 of 1
APPLICATION NO. : 10/842791
DATED : April 10, 2007
INVENTOR(S) : Schade et al.

It is certified that error appears in the above-identified patent and that said Letters Patent is hereby corrected as shown below:

On the title page
Item 57, Line 2:
Before "defeats" insert --which--.

Column 4, Line 54:
After "powder" insert --and--.

Signed and Sealed this

Fourth Day of December, 2007

JON W. DUDAS
*Director of the United States Patent and Trademark Office*